2,962,352

PURIFICATION OF ZIRCONIUM HALIDES

Stuart Schott, Virgil L. Hansley, and Harry Greenberg, Cincinnati, Ohio, assignors to National Distillers and Chemical Corporation, New York, N.Y., a corporation of Virginia No Drawing. Filed July 26, 1957, Ser. No. 674,275

7 Claims. (Cl. 23—87)

This invention relates to a new and improved process for the purification of zirconium halides. More specifically, the invention pertains to a method for removing metal impurities from zirconium tetrahalide.

Recently there have been increased demands for purified zirconium halides free of contaminating metals which are often associated therewith. In the preparation of high grade zirconium metal, for example, processes have been proposed involving the reduction of zirconium tetrahalides with known reducing agents. It is essential in these processes that the zirconium tetrahalides being reduced have a minimum contamination of certain metal chlorides such as iron chloride, aluminum chloride, etc. Heretofore, crude zirconium tetrahalides have been purified by sublimation in the presence of a reducing agent such as gaseous hydrogen. This purification method has not proved commercially adaptable in that the desired degree of purification is not achieved and because of the operational hazards involved. An improved process has been proposed recently which generally involves the distillation or volatilization of purified zirconium halide from a fused mixture containing the impure zirconium halide and at least one alkali metal halide. Discussions concerning this method are found in the articles by Horrigan, "Journal of Metals," October 1955, pages 1118–1120 and by Howell et al., "Journal of Metals," January 1957, pages 193–200. The recovery of pure zirconium chloride by distillation from a molten salt bath containing one or more alkali metal chlorides, preferably a mixture of sodium and potassium chlorides, is disclosed in U.S. Patent No. 2,443,253 to Kroll et al. A similar method is taught by Eaton in U.S. Patent No. 2,744,060 wherein zirconium halides dissolved in an alkali metal chloride melt or in a low-melting eutectic of sodium chloride and potassium chloride are distilled out and collected as separate, purified products.

Though this process results in the production of purified zirconium halides, difficulties have arisen in attempting to adapt the process for commercial operation. It has been found, for example, that the zirconium tetrahalide product recovered by distillation began to change after a relatively short period of operation from the initial snow white color, indicative of high purity, to a faint yellow color, which results from the volatilization of certain metal halide impurities, particularly ferric chloride, from the fused salt mixture. This relatively early depletion of the purification capacity of the fused salt mixture also makes continuous operations difficult. The exact cause of this loss in effectiveness is not fully understood. It is believed, however, that the concentration of the metal impurities build up rapidly in the fused salt to a level where solubility or complex formation, which maintains the impurities as less volatile materials, no longer serves to retain the impurities in the molten mixture. Consequently, it is necessary to remove the contaminated fused melt and to replace it with a fresh mixture. It is also possible to remove and filter continuously the fused melt to remove some of the undesirable insoluble impurities such as zirconium oxide or ferrous chloride. Since certain of the volatile impurities, e.g. ferric chloride, are soluble in the melt, it would be necessary by use of available techniques to remove the melt from the reaction zone and process it by some type of wet chemistry technique to lower the concentration of these soluble metal impurities.

It is one object of this invention to overcome the above disadvantages of the fused salt mixture method for the purification of zirconium halides. Another object of this invention is to provide a purification process which is readily adaptable for continuous operation. A still further object is to provide a method for suppressing the volatility of the metal halide impurities in the fused salt mixture. Other objects will become apparent from the ensuing description of the invention.

In accordance with the present invention a method has been discovered for the purification of commercial zirconium halides by distillation from a fused salt mixture whereby metal halide impurities are maintained in the fused salt mixture and whereby impure zirconium halide may be continuously added to the fused salt mixture while continuously recovering purified zirconium halide therefrom. More specifically, it has been found that if small amounts of finely divided metal or compounds thereof such as iron, zirconium, zirconium dichloride, zirconium trichloride, and mixtures thereof are present during the distillation or vaporization the volatility of undesirable metal halide impurities is effectively suppressed and purified zirconium tetrahalide may be recovered from the fused salt mixture by distillation. It also has been found that the purifying capacity of the fused salt mixture may be maintained by periodically adding one or more of the aforementioned finely divided metals to the salt mixture either when depletion becomes apparent or at established intervals during the reaction. The amount of finely divided metal required is only that amount necessary to suppress the volatility of the undesirable metal halide impurities. For example, it is only necessary to have a trace amount of the metal present in the molten salt mixture to hold back the iron impurities. On the other hand, the maximum amount of metal employed will be that amount which adversely affects the fluidity of the molten salt mixture. In many instances the amount of metal may range from about 0.5 to 5.0 wt. percent, based on the total weight of the molten salt mixture. It will be understood that the state of subdivision of the metal is important only in providing enough surface area for reaction with the impure zirconium tetrahalide. Furthermore, the selection of the metal reactant will depend on its ability to convert the metallic impurities in the crude zirconium tetrahalide to non-volatile forms.

In accordance with another feature of this invention, the metal agent may be employed in the form of chemical complexes obtained by partially reducing zirconium tetrahalide with an alkali metal such as sodium. The complexes may be prepared, for example, by passing zirconium tetrachloride with metallic sodium into a bed of sodium chloride, which may contain some zirconium subchlorides from a previous reaction, under an inert gaseous atmosphere such as argon. In order to prepare the effective materials for the purpose of this invention, the amount of sodium employed will be less than the stoichiometric amount required to completely reduce the zirconium tetrachloride to zirconium metal. Preferably, the amount of sodium employed will constitute about 25 to 50% of the stoichiometric amount. The reaction is carried out at a temperature above the melting point of sodium but below the melting point of sodium chloride.

More specifically, the reaction temperature will be about 150° to 400° C. and preferably about 150° to 200° C. The reaction bed, containing the reaction mixture as well as a portion of the reaction products is maintained in a state of agitation by vigorous mechanical stirring or inert gas fluidization. After the reaction has been completed, a free flowing, finely divided solid dry reaction product is recovered from the reaction vessel. For purposes of a more complete description, 49.5 parts of zirconium tetrachloride vapor is reacted with 9.75 parts of sodium, this amount of sodium being sufficient for only about 50% reduction of the zirconium tetrachloride, in a bed of finely divided sodium chloride and zirconium subchlorides at a temperature about 200° C. The reaction is carried out in a continuous manner and the finely-divided, free-flowing, solid reaction product removed continuously from the reactor by means of a screw conveyor. The exact nature of the reaction product is difficult to determine, though it has been established that free zirconium and sodium chloride are not present. The reaction product does, however, conform to the empirical formula $M_aZrX_b$, wherein M corresponds to the alkali metal employed as the reducing agent and X is the particular halogen used. In accordance with the preferred method of carrying out the invention, the atomic ratio of $a:b$ is about 1:4 to 2:4. Since these reaction products have not been definitely proven to be chemical compounds as contrasted with mixtures, they will be referred to throughout this specification as chemical complexes or compositions.

In general, the salt mixtures employed for the purposes of this invention must be selected so that low-melting eutectic mixtures result. It is preferred that the fused salt mixture melt at a temperature within the range of about 200° to 400° C., preferably about 250° to 350° C. As previously noted, the fused salt mixtures useful in this invention will comprise a mixture of the crude impure zirconium halide and at least one alkali metal halide. Using the zirconium tetrachloride system as an example, the fused salt mixture may comprise sodium chloride, potassium chloride or mixtures of these two alkali metal chlorides and the crude zirconium halide. Thus, the fused salt mixtures may comprise.

(a) $NaCl-ZrCl_4$
(b) $KCl-ZrCl_4$
(c) $NaCl-KCl-ZrCl_4$

Though the relative percentages of the alkali metal chloride and the impure zirconium tetrachloride in the fused salt mixtures may vary over a wide range, it is preferred that the alkali metal chloride constituent be present in an amount of about 10 to 50 wt. percent, preferably about 14 to 30 wt. percent, while the crude zirconium tetrachloride constitutes about 50 to 90 wt. percent, preferably about 70 to 86 wt. percent. The foregoing weight percentages are based on the total weight of the salt mixture. When two or more alkali metal chlorides are employed in forming the salt mixture, the mol ratio of the two alkali metal chlorides (NaCl:KCl) may range from about 1:2 to 1:4. It will also be understood that alkaline earth metal halides such as barium, strontium, magnesium chlorides may be employed in conjunction with the alkali metal halides in formulating the fused salt mixtures useful for the purposes of the present invention.

The purified zirconium tetrachloride distilled or vaporized from the above described fused mixture at a temperature of about 330° to 600° C., preferably about 340° to 450° C., is condensed and recovered. The temperature of volatilization is dependent on the concentration of $ZrCl_4$ in the melt. As will be hereinafter shown, the zirconium halide prepared in accordance with this invention, has a markedly lower metal impurity content than the crude feed material.

For illustrative purposes the invention will be described in its application to the purification of crude zirconium tetrachloride. It will be understood, however, that the purification process is also applicable to other halides of zirconium such as zirconium tetraiodide and tetrabromide. Crude zirconium tetrahalide as utilized in this invention may be derived from any known source. By crude zirconium halide it is meant the zirconium halide which may be contaminated with one or more halides or other compounds of such metals as aluminum, cadmium, cobalt, chromium, iron, magnesium, manganese, molybdenum, nickel, lead, silicon, tin, titanium, vanadium, tungsten and etc. For the purposes of this invention, hafnium which is ordinarily associated with zirconium in nature, is not considered a deleterious impurity.

The invention will be more fully understood by reference to the following illustrative examples.

EXAMPLE I

An apparatus was assembled consisting of a U-tube with 7-inch side arms made of 1.25 inch Pyrex tubing. To one arm was attached a collecting tube which is a laboratory version of a commercial Stauffer condenser. The U-tube was charged with a melt consisting of 109.4 gms. $ZrCl_4$ and 17.6 gms. of KCl. The system was blanketed with argon gas and the melt was heated to a temperature of about 360° C. When gentle boiling commenced yellow colored commercial grade $ZrCl_4$ was added while purified $ZrCl_4$ passed out to the condenser. The rate of addition of the crude $ZrCl_4$ and the heating were regulated to maintain a constant volume of melt.

The recovered $ZrCl_4$ was snow white until about 150 grams of the crude $ZrCl_4$ had been added to the melt and 150 grams pure $ZrCl_4$ volatilized therefrom. Additional feed of crude $ZrCl_4$ produced a yellow condensate, which indicate the presence of metal impurities. At this point the addition of 0.25 gram of powdered metallic zirconium to the boiling melt caused an immediate restoration of snow white color of the distilling $ZrCl_4$ being condensed in the condenser. The color of the melt became darker during the run, but the viscosity showed no apparent change.

Analysis of samples taken at the beginning of the distillation and following the addition of the powdered zirconium are shown in Table 1. Comparative analyses of the crude $ZrCl_4$ and purified $ZrCl_4$ obtained by the above-described hydrogen sublimation method are also set forth.

Table 1 [1]

COMPARATIVE ANALYSES OF $ZrCl_4$

| Element | Commercial Crude | Hydrogen Sublimed | Fused Salt Sublimed | |
|---|---|---|---|---|
| | | | 1st Fraction | 2nd Fraction [2] |
| Al | 500 | 300 | 40 | 50 |
| B | .35 | .4 | .7 | .8 |
| Cd | .5 | .5 | .5 | .5 |
| Co | 5 | 5 | 5 | 5 |
| Cr | 15 | .5 Est. | 10 | 10 |
| Fe | 750 | 20 | 20 | 20 |
| Mg | 60 | 15 | 25 | 25 |
| Mn | 5 | 5 | 5 | 5 |
| Mo | 10 | 10 | 10 | 10 |
| Ni | 25 | 10 | 15 | 10 |
| Pb | 10 | 10 | 11 | 10 |
| Si | 300 | 40 Est. | 40 | 40 |
| Sn | 5 | 5 | 5 | 5 |
| Ti | 140 | 20 | 20 | 20 |
| V | 10 | 10 | 10 | 10 |
| W | 20 | 20 | 20 | 20 |

[1] Spectrographic analyses reported in parts per million.
[2] Collected after addition of powdered zirconium metal to melt following the recovery of yellow colored product.

EXAMPLE II

Using the apparatus described in Example I, the following melt was employed to purify crude commercial $ZrCl_4$:

Table 2

|       | Mol Percent | Wt. Percent |
|-------|-------------|-------------|
| $ZrCl_4$ | 65.0     | 86.00       |
| NaCl  | 8.0         | 2.66        |
| KCl   | 27.0        | 11.45       |

The apparatus was charged with 116 grams of the melt. At a temperature of about 355° C., $ZrCl_4$ began distilling out, and crude $ZrCl_4$ was continuously added to the melt. In three hours about 320 grams of purified $ZrCl_4$ was recovered having a spectrographic analysis the same as the 1st fraction recovered in Example I. This fraction came over snow white in the beginning, but it developed a faint yellow color which increased at a steady rate towards the end of the distillation. This indicated a build-up of $FeCl_3$ in the eutectic melt and a lessening of its purification efficiency. Two grams of finely divided zirconium metal were added to the melt, and the distillation continued for another 1.5 hours to obtain an additional 150 grams of purified $ZrCl_4$. This material was also snow white in color having a spectrographic analysis similar to the previously collected fraction and having a zirconium oxide content of 0.006%.

EXAMPLE III

Using apparatus identical with that used in Example I, 116 grams of a eutectic composed of 86 wt. percent $ZrCl_4$, 2.66 wt. percent NaCl and 11.45 wt. percent KCl was introduced together with 1.16 grams of 100 mesh zirconium powder. The melt (at 300°) soon developed a blueish color. The introduction of crude $ZrCl_4$ and its distillation from the system in a continuous manner produced a snow white product analyzing the same as shown in column 4, Table 1.

EXAMPLE IV

In another experiment 150 grams of a mixed salt melt were prepared, containing 2.66 wt. percent NaCl, 11.45 wt. percent KCl, and 86.0 wt. percent $ZrCl_4$. To this melt was added 1.5 grams of $AlCl_3$ and 1.5 grams of $FeCl_3$. Twenty grams of $ZrCl_4$ were volatilized from the melt, and the recovered material analyzed spectrographically 150 p.p.m. Al and 318 p.p.m. Fe. A duplicate experiment was run except that 3 grams of iron powder were added to the melt prior to vaporization of 20 grams of $ZrCl_4$. In this run the recovered $ZrCl_4$ analyzed 110 p.p.m. Al and less than 20 p.p.m. Fe.

The above data show that an improved process for the purification of zirconium tetrahalide has been discovered, which provides for a commercially adaptable process whereby purified zirconium tetrahalide can be produced in a continuous and an effective manner. The data also show that the process of this invention achieves results which are significantly different than those obtained by employing the previously proposed systems.

While particular embodiments of this invention are shown above, it will be understood that the invention is obviously subject to variance and modification without departing from its broader aspects. For example, the apparatus employed for carrying out the above-described purification system may be maintained under vacuum or a controlled inert atmosphere, though neither of these features need be employed. If, however, an inert atmosphere is desired, such gases as argon, nitrogen, and helium may be effectively employed. The distillation may, for example, be carried out while passing the inert gas continuously through the system with subsequent recovery and recycling. It will be understood, therefore, that other modifications and variations may be employed within the scope of the foregoing description of the invention and the following claims.

What is claimed is:

1. In a method for the production of purified zirconium tetrahalide which comprises heating a molten mixture containing about 70 to 86 wt. percent impure zirconium tetrahalide, selected from the group consisting of zirconium tetrachloride, zirconium tetrabromide and zirconium tetraiodide, and about 14 to 30 wt. percent of at least one alkali metal halide at a temperature within the range of about 330° to 600° C. to vaporize zirconium tetrahalide and adding impure zirconium tetrahalide to said molten mixture at about the same rate that the zirconium tetrahalide is vaporized therefrom, the improvement which comprises carrying out said vaporization from said molten mixture having incorporated therein a finely divided material selected from the group consisting of iron, zirconium, zirconium dihalide, zirconium trihalide, zirconium subhalide-alkali metal halide complexes and mixtures thereof, said material being present in an amount sufficient to suppress the volatility of metal halide impurities.

2. The method of claim 1 wherein said halides of zirconium and alkali metal are chlorides.

3. The method of claim 1 wherein said finely divided material is iron.

4. The method of claim 1 wherein said finely divided material is zirconium.

5. The method of claim 1 wherein the amount of said finely divided material is within the range of about 0.5 to 5.0 wt. percent based on the total weight of the molten mixture.

6. A continuous method for the purification of zirconium tetrachloride which comprises forming a molten mixture of about 70 to 86 wt. percent impure zirconium tetrachloride, about 14 to 30 wt. percent of at least one alkali metal chloride, and about 0.5 to 5.0 wt. percent, based on the total weight of the molten mixture, of finely divided zirconium metal, heating said mixture to a temperature within the range of about 330° to 600° C. to vaporize purified zirconium tetrachloride therefrom, recovering said vaporized zirconium tetrachloride, and continuously adding to said molten mixture impure zirconium tetrahalide at substantially the same rate that the purified zirconium tetrachloride is being vaporized.

7. The method of claim 6 wherein said alkali metal chloride is selected from the group consisting of sodium chloride, potassium chloride, and mixtures thereof.

References Cited in the file of this patent

UNITED STATES PATENTS

| 2,443,253 | Kroll | June 15, 1948 |
| 2,830,888 | Wade | Apr. 15, 1958 |
| 2,847,316 | Michel et al. | Aug. 12, 1958 |
| 2,916,362 | Horrigan et al. | Dec. 8, 1959 |

FOREIGN PATENTS

| 1,133,956 | France | Nov. 26, 1956 |
| 771,144 | Great Britain | Mar. 27, 1957 |

OTHER REFERENCES

Journal of Metals, vol. 7, No. 10, October 1955, pages 1118–1120.